(12) United States Patent
Nosaka et al.

(10) Patent No.: US 7,393,281 B2
(45) Date of Patent: Jul. 1, 2008

(54) POWER TRANSMISSION DEVICE

(75) Inventors: Michiyasu Nosaka, Anjou (JP); Yasuo Tabuchi, Toyoake (JP); Motohiko Ueda, Okazaki (JP); Yoshiki Tada, Okazaki (JP)

(73) Assignee: DESNO CORPORATION, Kariya (JP)

( * ) Notice: Subject to any disclaimer, the term of this patent is extended or adjusted under 35 U.S.C. 154(b) by 148 days.

(21) Appl. No.: 11/251,774

(22) Filed: Oct. 18, 2005

(65) Prior Publication Data

US 2006/0089201 A1 Apr. 27, 2006

(30) Foreign Application Priority Data

Oct. 26, 2004 (JP) ............... 2004-310693
Mar. 4, 2005 (JP) ............... 2005-060838

(51) Int. Cl.
*F16D 9/04* (2006.01)
(52) U.S. Cl. .......................... 464/32; 474/903
(58) Field of Classification Search .............. 464/10, 464/30, 32; 403/2; 417/319; 474/70, 903
See application file for complete search history.

(56) References Cited

U.S. PATENT DOCUMENTS 1,818,946 A * 8/1931 Freund ................ 464/10
2003/0017909 A1 1/2003 Murase et al.
2003/0130044 A1 7/2003 Kanai et al.
2003/0194263 A1 * 10/2003 Ueda et al. .............. 403/2
2004/0063503 A1 * 4/2004 Aoki et al. .............. 464/32

FOREIGN PATENT DOCUMENTS

JP A-2003-35255 2/2003
JP A-2003-206950 7/2003

* cited by examiner

*Primary Examiner*—Greg Binda
(74) *Attorney, Agent, or Firm*—Posz Law Group, PLC

(57) ABSTRACT

In the power transmission device having a torque limiting function for shutting off the transmission of an excessively high torque between the pulley 1 and the rotary shaft 5, the hub 2 and the rotary shaft 5 are connected to each other by means of screw engagement between the female screw portion 2d, which is formed on the inner circumferential face of the hub 2, and the male screw portion 5d which is formed on the outer circumferential face of the forward end portion 5a of the rotary shaft 5, and the seal means 4 for sealing between the hub and the rotary shaft is provided adjacent to the front face or the front and rear faces of the screw engaging portion. The torque limiting function may be provided on the rotary shaft side or the hub side.

5 Claims, 16 Drawing Sheets

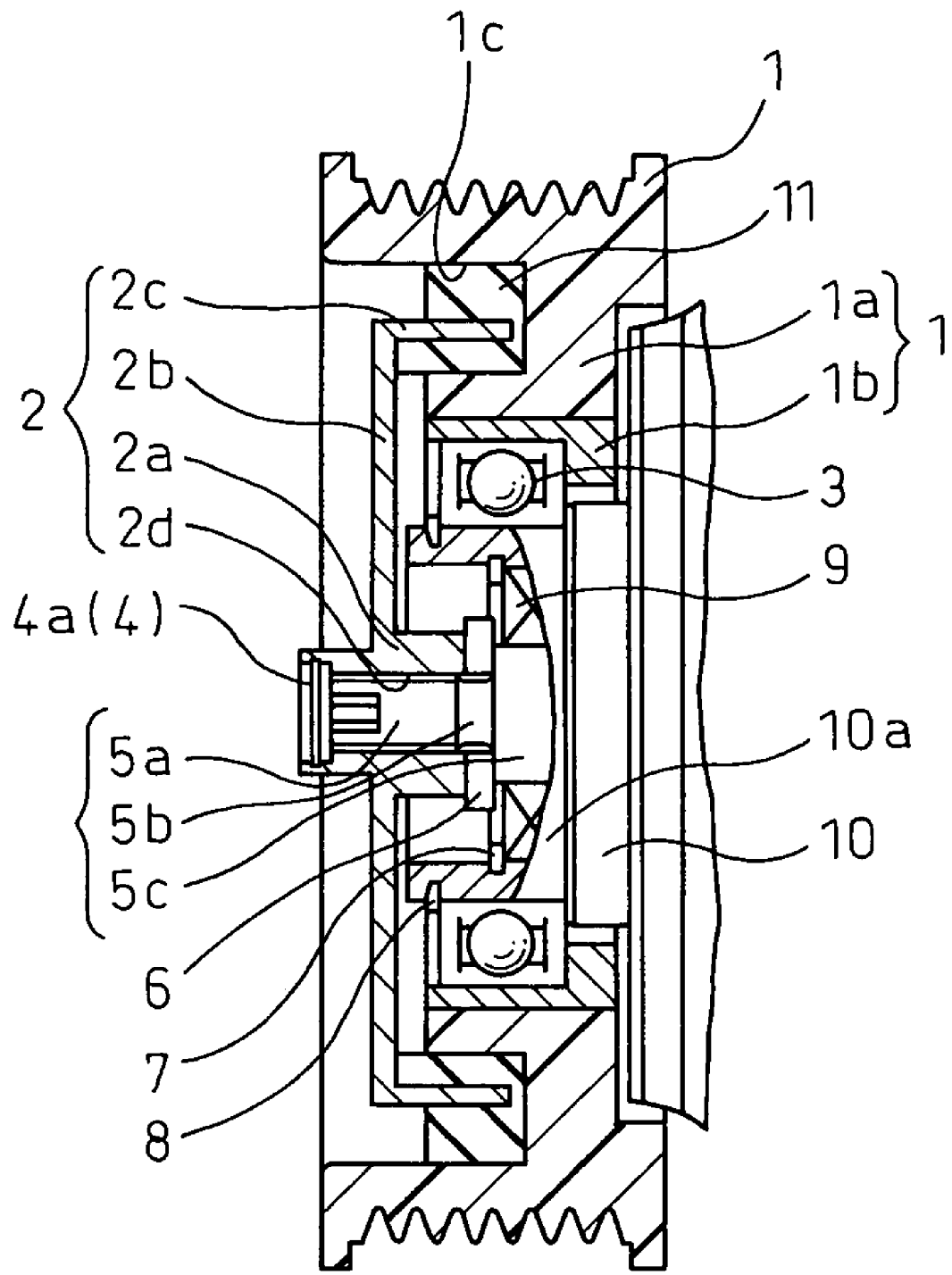

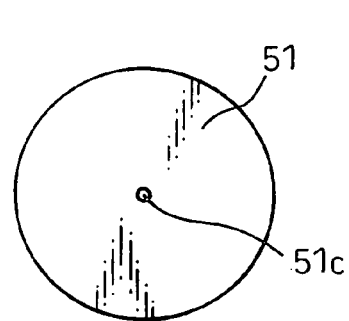
Fig.21-1
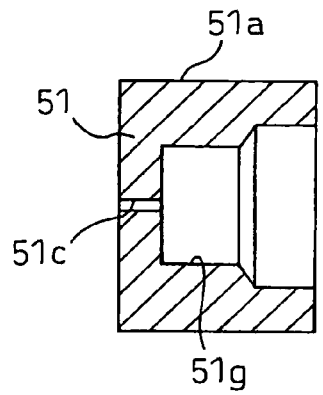
Fig.21-2
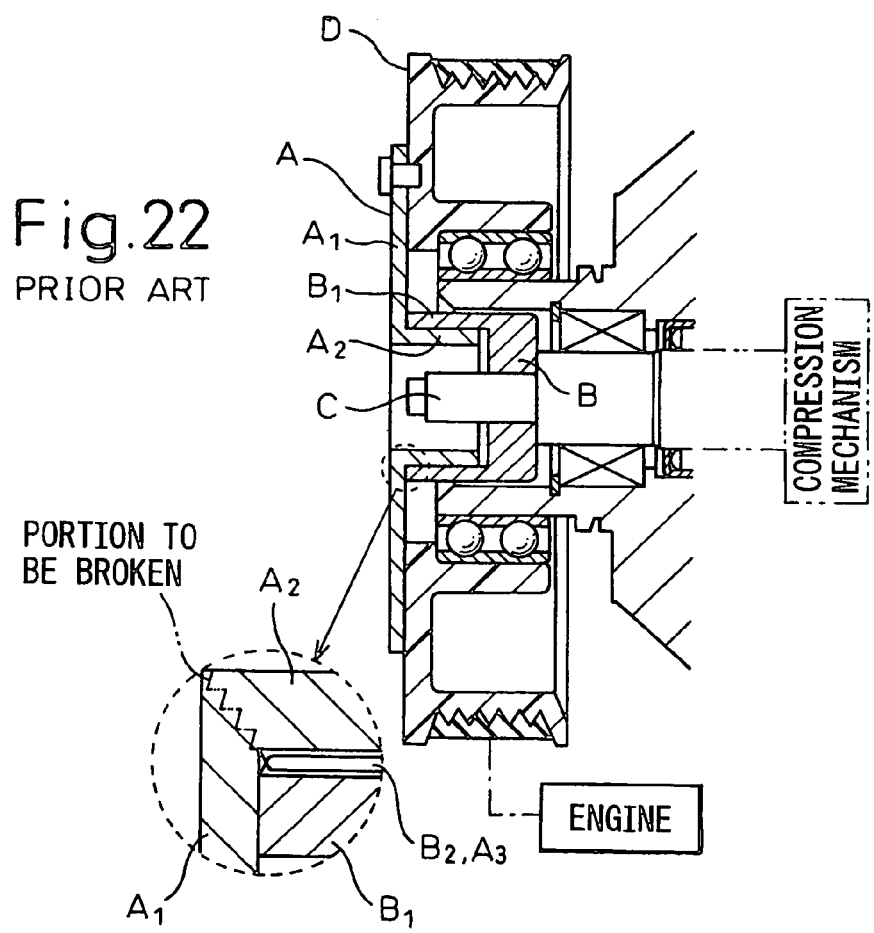
Fig.22 PRIOR ART
Fig.23 PRIOR ART

POWER TRANSMISSION DEVICE

BACKGROUND OF THE INVENTION

The present invention relates to a power transmission device having a torque limiting function. More particularly, the present invention relates to a power transmission device incorporated into a compressor of an air conditioner for vehicle use.

In a conventional power transmission device for transmitting power to a compressor, in order to avoid the occurrence of a problem in which a belt of the compressor, which is used for transmitting power, is damaged when the compressor has seized due to a heavy load, a torque limiter is arranged in the power transmission device. For example, in the case of a torque limiter shown in the official gazette of JP-A-2003-206950, a portion of the power transmitting passage is composed of a screw-in connection.

In the official gazette of JP-A-2003-206950, as shown in FIG. 22, the adapter B, from which the cylindrical limiter attaching portion $B_1$ integrally protrudes, is press-fitted and fixed to the rotary shaft C. On the inner circumferential face of this limiter attaching portion $B_1$, the female screw $B_2$ is formed. On the other hand, the torque limiter A, which is fixed to the pulley D, is integrally composed of a disk-shaped flange portion $A_1$ and a cylindrical connecting portion $A_2$. On the outer circumferential face of the connecting portion $A_2$, the male screw $A_3$ is formed. When the torque limiter A is engaged with the adapter B by means of screwing in this way, the pulley D is connected to the rotary shaft C via the torque limiter A.

In this torque limiter system, to which the above screwing engagement is applied, by utilizing an excessively high axial force which is generated in the screwing engagement portions $A_3$, $B_2$ by an excessively high intensity of torque generated at the time of seizure of the compressor, a portion of the power transmitting path is broken so that power transmission can be shut off.

However, in this torque limiter system, the fastening is accomplished by means of screwing. Therefore, the operation accuracy of the torque limiter is affected by the intensity of torque generated at the time of seizure of the compressor, and by the screwing portions $A_3$, $B_2$ which are engaged with each other and by the coefficient of friction on the seating face which is a contact face of the torque limiter A with the adapter B. Especially, in the case of the power transmission device shown in the official gazette of JP-A-2003-206950, when the coefficient of friction is changed by the influence of corrosion of the screw engagement portion caused by the water which has entered the device from the outside, the operational torque of the torque limiter changes with time.

Further, in the case where the screwing engagement portion is covered with oil so as to stabilize the coefficient of friction, oil flows out while the device is actually being used, and the coefficient of friction changes, which affects the accuracy of the torque limiter.

SUMMARY OF THE INVENTION

The present invention has been accomplished to solve the above problems. It is an object of the present invention to provide a power transmission device characterized in that: it is possible to prevent a change in the coefficient of friction caused by the invasion of water and foreign objects from the outside into the screw fastening portion; it is also possible to prevent a change in the coefficient of friction caused by the leakage of oil, which was coated on the screw portion at the time of the initial assembling, when time has passed; the accuracy of the torque limiter is enhanced and the operation of the torque limiter is stabilized; the manufacturing cost is reduced; and the manufacturing and assembling work is simplified.

A power transmission device of the present invention includes a pulley, a hub, a torque transmitting elastic member and a torque limiter. The hub and the rotary shaft are connected to each other by the screwing engagement of a female screw portion, which is formed on the inner circumferential face of the hub, with a male screw portion which is formed on the outer circumferential face of the forward end portion of the rotary shaft. A sealing means for tightly sealing between the hub and the rotary shaft is provided in a portion adjacent to the front of this screw engaging portion or in portions adjacent to the front and the rear portion of this screwing portion. Due to this structure, it is possible to prevent water from getting into the screw engaging portion from the outside and, further, it is possible to prevent oil, which was coated on each screw portion at the time of initial assembling, from leaking outside. Accordingly, it is possible to prevent a change in the coefficient of friction caused by the corrosion in each screw portion. Therefore, the operation of the torque limiter can be stabilized.

In a power transmission device of the present invention, the torque limiter is arranged on the rotary shaft side. Therefore, the torque limiter can be a simple structure in which a small diameter portion is provided on the rotary shaft.

In a power transmission device of the present invention, a sealing means provided in the front of the screw engaging portion closes a boss opening portion of the hub. Due to this structure, for example, the sealing means can be easily attached by using a flat packing member.

In a power transmission device of the present invention, a washer is inserted into the rotary shaft while coming into contact with the boss portion seating face of the hub, and a sealing means at the rear of the screw engaging portion is provided between this boss portion seating face and the washer. Even when the sealing means is provided at the rear of the screw engaging portion, it is possible to provide an excellent effect.

In a power transmission device of the present invention, a torque limiter is provided on the hub side. In this case, the hub is composed of a hub portion and a torque limiter portion, and the torque limiter portion is connected to the rotary shaft by means of screwing engagement. This screwing engagement portion is protected from the water, which enters the device from the outside, by a sealing means.

In a power transmission device of the present invention, an annular packing member is used as a sealing means for sealing between the hub and the rotary shaft. Due to this structure, it is possible to avoid the occurrence of a problem that an O-ring is pushed out from the setting position by an increase in the internal pressure at the time of using an O-ring.

In a power transmission device of the present invention, a protruding labyrinth is formed on all the outer circumferential face or the inner circumferential face of the packing member or on both the outer circumferential face and the inner circumferential face of the packing member. Due to the above structure, the sealing property of the packing member can be enhanced.

In a power transmission device of the present invention, a portion of the rotary shaft, in which the sealing means is provided, is made to be a square tool shape so as to be engaged with a tool, and a packing member, the inner circumferential surface of which is formed into the same square shape as that of the square tool shape portion, is used as the sealing means.

Due to this structure, it is possible to avoid the occurrence of a problem that the axial length is extended in the case where an O-ring is used in the device and, further, the assembling property can be improved.

In a power transmission device of the present invention, a plurality of minute through-holes are formed in the packing member. Due to this structure, it is possible to avoid the occurrence of a problem that the inner pressure is increased by the heat generated at the time of operating the compressor. Therefore, the sealing property of the packing member can be maintained.

In a power transmission device of the present invention, a plurality of cutout portions are provided on the inner circumferential face or the outer circumferential face of the packing member in the circumferential direction at regular intervals. In this case, it is possible to avoid the occurrence of a problem that the inner pressure is increased by the heat generated at the time of operating the compressor. Therefore, the sealing property of the packing member can be maintained.

In a power transmission device of the present invention, cutout portions are formed at the corner portions on the inner circumferential face of the packing member. In this case, an increase in the inner pressure can be avoided.

In a power transmission device of the present invention, a portion of the rotary shaft, in which the sealing means is provided, is made to be a square tool shape so as to be engaged with a tool, and the square corner portions are made to be round and an annular packing member is used for the sealing means, so that a minute gap can be formed between the outer circumferential face of the tool shape shaft and the inner circumferential face of the packing member. In this case, the inner pressure can be released from the gap. Therefore, it is possible to avoid the occurrence of a problem that the inner pressure is increased by the heat generated at the time of operating the compressor.

In a power transmission device of the present invention, a cap is used as a sealing means which surrounds a forward end portion of the rotary shaft and conducts sealing between the rotary shaft and the hub. Due to this structure, without unnecessarily increasing the size of the compressor, the screw engaging portion of the hub with the rotary shaft and the forward end portion of the rotary shaft can be protected from corrosion.

In a power transmission device of the present invention, one or a plurality of holes, for releasing the inner pressure, are formed in the cap. Due to this structure, it is possible to avoid the occurrence of a problem that the inner pressure is increased by the heat generated at the time of operating the compressor.

In a power transmission device of the present invention, on the outer circumferential face of the cap, ring-shaped grooves, spiral grooves or a plurality of linear grooves, which are provided in the circumferential direction at intervals being extended in the axial direction, are provided. Due to this structure, the sealing property between the cap and the hub can be improved.

In a power transmission device of the present invention, on the outer circumferential face of the cap, ring-shaped protrusions or a plurality of linear protrusions, which are provided in the circumferential direction at intervals being extended in the axial direction, are provided. Due to this structure, the inner pressure can be released.

In a power transmission device of the present invention, the cap is made of material such as rubber or resin. Alternatively, the cap is made of metal such as iron or aluminum. Alternatively, the cap is made of the a composite material. Therefore, it is possible to use the cap while the characteristics of the respective materials are exhibited.

The present invention may be more fully understood from the description of preferred embodiments of the invention, as set forth below, together with the accompanying drawings.

DESCRIPTION OF THE DRAWINGS

In the drawings:

FIG. 1 is a sectional view showing an overall structure of the power transmission device of a first embodiment of the present invention;

FIGS. 10A-1 is a plan view and FIGS. 10A-2 is a sectional view of the packing member of Example 2 of the fifth embodiment;

FIG. 10B-1 is a plan view and FIGS. 10B-2 is a sectional view of the packing member of Example 3 of the fifth embodiment;

FIG. 10C-1 is a plan view and FIGS. 10C-2 is a sectional view of the packing member of Example 4 of the fifth embodiment;

FIGS. 11A-1 is a plan view and FIGS. 11A-2 is a sectional view of the packing member of Example 5 of the fifth embodiment;

FIG. 11B-1 is a plan view and FIGS. 11B-2 is a sectional view of the packing member of Example 6 of the fifth embodiment;

FIG. 11C-1 is a plan view and FIGS. 11C-2 is a sectional view of the packing member of Example 7 of the fifth embodiment;

FIGS. 12A-1 is a plan view and FIGS. 12A-2 is a sectional view of the packing member of Example 8 of the fifth embodiment;

FIGS. 12B-1 is a plan view and FIGS. 12B-2 is a sectional view of the packing member of Example 9 of the fifth embodiment;

FIGS. 12C-1 is a plan view and FIGS. 12C-2 is a sectional view of the packing member of Example 10 of the fifth embodiment;

FIGS. 13A-1 is a plan view and FIGS. 13A-2 is a sectional view of the packing member of Example 11 of the fifth embodiment;

FIGS. 13B-1 is a plan view and FIGS. 13B-2 is a sectional view of the packing member of Example 12 of the fifth embodiment;

FIGS. 17A-1 is a front view and FIGS. 17A-2 is a sectional view of Example A of the seal means of the sixth embodiment;

FIGS. 17A-3 is a sectional view of a seal means like that of FIGS. 17A-2 made of elastic material;

FIGS. 17B-1 is a front view and FIGS. 17B-2 is a sectional view of Example B of the seal means of the sixth embodiment;

FIGS. 18A-1 is a front view and FIGS. 18A-2 is a side view of the cap of Example C of the sixth embodiment;

FIGS. 18B-1 is a front view and FIGS. 18B-2 is a side view of the cap of Example D of the sixth embodiment;

FIGS. 18C-1 is a front view and FIGS. 18C-2 is a side view of the cap of Example E of the sixth embodiment;

FIGS. 19A-1 is a front view and FIGS. 19A-2 is a side view of the cap of Example F of the sixth embodiment;

FIGS. 19B-1 is a front view and FIGS. 19B-2 is a sectional view of the cap of Example G of the sixth embodiment;

FIGS. 20A-1 is a front view and FIGS. 20A-2 is a sectional view of the cap of Example H of the sixth embodiment;

FIGS. 20B-1 is a front view and FIGS. 20B-2 is a sectional view of the cap of Example I of the sixth embodiment;

FIGS. 20C-1 is a front view and FIGS. 20C-2 is a sectional view of the cap of Example J of the sixth embodiment;

FIGS. 21-1 is a front view and FIGS. 21-2 is a sectional view of the cap of Example K of the sixth embodiment; and FIG. 22 is a sectional view of the conventional power transmission; and FIG. 23 is an enlarged sectional window taken from FIG. 22.

DESCRIPTION OF THE PREFERRED EMBODIMENT

Figure 2:
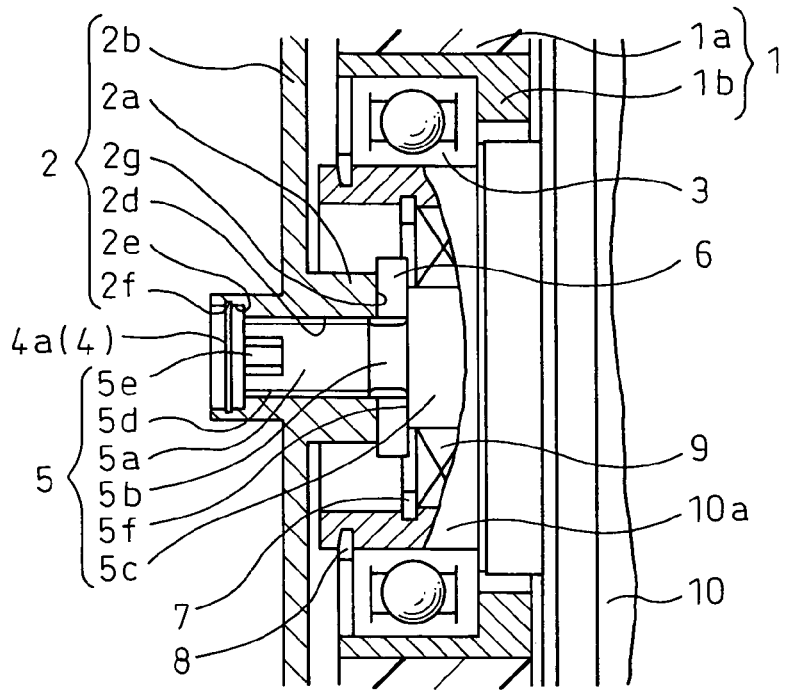
FIG. 2 is a sectional view showing a primary portion of the power transmission device of the first embodiment of the present invention.
Figures 1, 2, 10A:
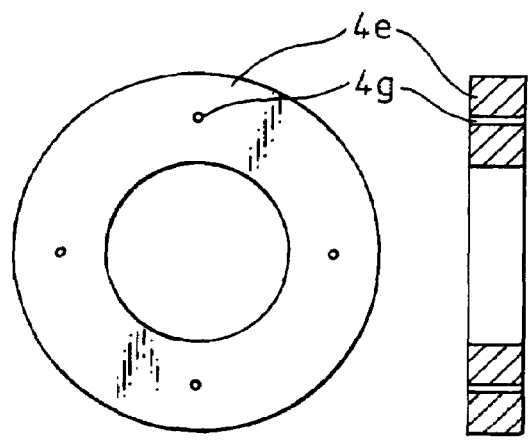

Referring to the accompanying drawings, embodiments of a power transmission device of the present invention will be explained as follows. The power transmission device of the present invention is preferably incorporated into a compressor of an air conditioner for vehicle use. FIG. 1 is a sectional view showing an overall structure of the power transmission device of the first embodiment of the present invention, and FIG. 2 is a sectional view showing a primary portion of the power transmission device of the first embodiment of the present invention. The power transmission device of the present invention transmits power (torque) from the pulley 1, which is a drive side rotary member driven by an engine or motor, to the hub 2 which is a driven side rotary member fixed to the rotary shaft 5 of the compressor. The pulley 1 and the hub 2 are arranged on the same shaft.

The pulley 1 is rotatably attached to the cylindrical portion 10a, which is provided on one end side of the casing 10 of the compressor, via the bearing device 3. The pulley 1 is preferably composed of a pulley body 1a, which is made of thermoplastic synthetic resin, and a ring 1b which is made of metal such as iron. The pulley body 1a and the ring 1b are integrally formed by means of insertion molding. On the front side (on the left in FIG. 1) of the pulley 1, the annular pocket portion 1c is formed in which the elastic member 11 used for torque transmission is accommodated and held. On the outer circumferential face of the pulley 1 a belt, not shown, is wound. Therefore, the pulley 1 can be rotated by the power supplied from the outside such as a motor. The bearing device 3 is engaged with the cylindrical portion 10a and prevented from moving in the axial direction by the first snap ring 8 embedded in the groove formed on the outer circumferential face of the cylindrical portion 10a. The casing 10 and the rotary shaft 5 are tightly closed by the shaft sealing device 9, so that refrigerant and oil can be prevented from leaking outside. In this connection, the shaft sealing device 9 is also prevented from moving in the axial direction by the second snap ring 7 embedded in the groove formed on the inner circumferential face of the cylindrical portion 10a.

The rotary shaft 5 of the compressor includes: a forward end portion 5a, the diameter of which is small; a torque limiter portion 5b, the diameter of which is smaller than that of the forward end portion 5a; and a shaft portion 5c, the diameter of which is larger than that of the forward end portion 5a. The forward end portion 5a of the rotary shaft 5 is protruded from the casing 10, and the male screw portion 5d is formed on the outer circumferential face of the forward end portion 5a. The hole 5e, used for assembling, is formed on the end face of the forward end portion 5a. Further, in the transition portion from the limiter portion 5b of the rotary shaft 5 to the shaft portion 5c, the step-shaped step face 5f which functions as a stopper for stopping the washer 6 described later, is formed.

The hub 2 includes: a cylindrical boss portion 2a; a plate portion 2b protruding in the radial direction from the outer circumferential face of the boss portion 2a so that the plate portion 2b can be formed into a disk shape; and a cylindrical outer ring portion 2c connected to the forward end portion of the plate portion 2b. On the inner circumferential face of the boss portion 2a, the female screw portion 2d is formed. On the front side of the boss portion 2a, the opening portion 2e is formed, the diameter of which is larger than that of the female screw portion 2d, which is connected to the female screw portion 2d. On the inner circumferential face of the opening portion 2e, the groove 2f used for attaching the flat packing member 4a described later is formed. The rear end face of the boss portion 2a is formed into a seating face 2g and comes into contact with the washer 6.

In the outer ring portion 2c of the hub 2, the annular elastic member 11, made of elastic material such as rubber, is fixed by means of adhesion and so forth in such a manner that the upper and lower faces of the outer ring portion 2C are interposed by the annular elastic member 11. Under the above conditions, the outer ring portion 2c is inserted into the pocket portion 1c of the pulley 1, and the elastic member 11 is fixed to the pulley 1 by means of adhesion and so forth. Due to the above structure, torque is transmitted from the pulley 1 to the hub 2 via the elastic member 11.

Before the hub 2 is attached to the rotary shaft 5, the washer 6 is inserted into the rotary shaft 5. When the washer 6 comes into contact with the step face 5f of the shaft portion 5c of the rotary shaft 5, it is located just at the position where the torque limiter portion 5b of the rotary shaft 5 is arranged. After that, when the hub 2 is attached to the rotary shaft 5 by means of screwing, the seating face 2g of the boss portion 2a of the hub 2 is contacted with the washer 6. Accordingly, the washer 6 is interposed between the seating face 2g and the step face 5f.

When the flat packing member 4a, which is a sealing means 4, is fitted into the groove 2f provided on the inner circumferential face of the opening portion 2e formed in the boss portion 2a of the hub 2, it is attached to the hub 2. Accordingly, the opening portion 2e of the boss portion 2a is closed by the flat packing member 4a. Accordingly, the invasion of water from the outside into the screw engaging portions 2d, 5d, in which the hub 2 and the rotary shaft 5 are screwed to each other, can be prevented.

Next, operation of the power transmission device of this embodiment will be explained below. In FIG. 1, power supplied from the outside is transmitted to the pulley 1 via a belt not shown and further transmitted to the hub 2 via the elastic member 11. The hub 2 and the rotary shaft 5 of the compressor are connected to each other by the screwing engagement between the female screw portion 2d of the hub 2 and the male screw portion 5d of the rotary shaft 5. The power supplied from the outside then drives the rotary shaft 5 of the compressor via the hub 2.

When the compressor is out of order, for example, when the compressor has seized and an excessively high torque is generated by the compressor, an excessively high axial force is generated in the joining portion of the hub 2 and the rotary shaft 5 which are screwed to each other. In this embodiment, the torque limiter portion 5b is provided on the rotary shaft 5. Therefore, by utilizing the excessively high axial force generated in the screw engaging portions 2d, 5d between the hub 2 and the rotary shaft 5 by the excessively high torque generated at the time of seizure of the compressor, the torque limiter is set up on the rotary shaft 5. In the torque limiter structure in which this excessively high intensity of axial force is utilized, the torque limiter characteristic is mainly determined by the torque and the coefficient of friction of the contact portion and the screw engaging portion (the seating face and the screw portion).

However, when water enters the screw engaging portion from the outside and the coefficient of friction of the female and the male portions 2d, 5d is changed by the corrosion, it is impossible to generate a target intensity of axial force. Therefore, in this embodiment, in order to suppress the occurrence of change with time of the screw portion, the seal means (the flat packing 4a) 4 is arranged on the front face of the screw engaging portion so that the invasion of water and foreign objects can be prevented.

This seal means 4 also has a function of preventing oil from flowing out, with time, in the case where oil is coated on the screw portion at the initial stage of assembly.

Figure 3:
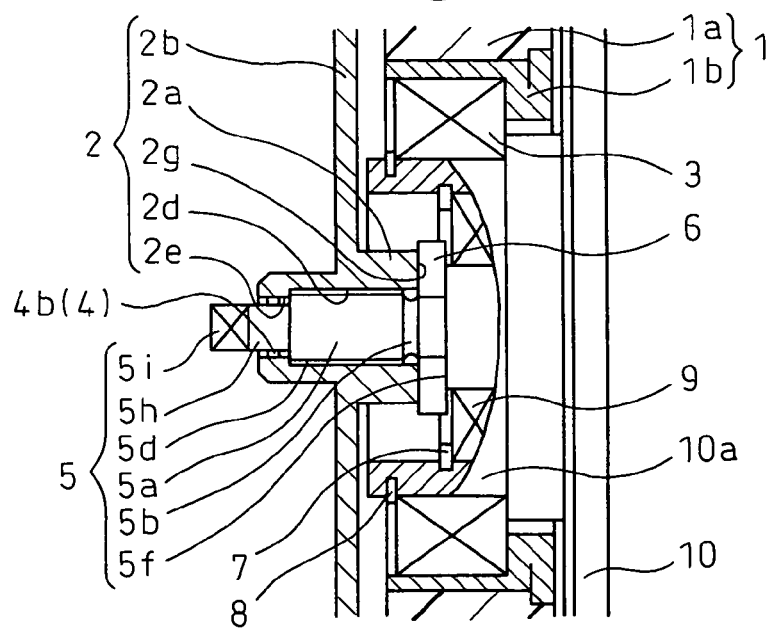
FIG. 3 is a sectional view showing a primary portion of the power transmission device of a second embodiment of the present invention.

FIG. 3 is a sectional view showing a primary portion of the power transmission device of the second embodiment of the present invention. In this second embodiment, at the forward end portion 5a at which the male screw portion 5d of the rotary shaft 5 of the compressor is provided, the seal portion 5h, the diameter of which is smaller than that of the male screw portion 5d, and the plane portion 5i, used for assembling, are provided. The diameter of the opening portion 2e of the hub 2 is smaller than the inner diameter of the female screw portion 2d. In order to seal the inner circumferential face of the opening portion 2e of the hub 2 and the outer circumferential face of the seal portion 5h of the rotary shaft 5, an O-ring 4b, which is the seal means 4, is provided. In this way, the seal means 4 is provided on the front face of the screw engaging portion 2d, 5d of the hub 2 and the rotary shaft 5. Other points of the structure are the same as those of the first embodiment. Therefore, explanations are omitted here.

Figure 4:
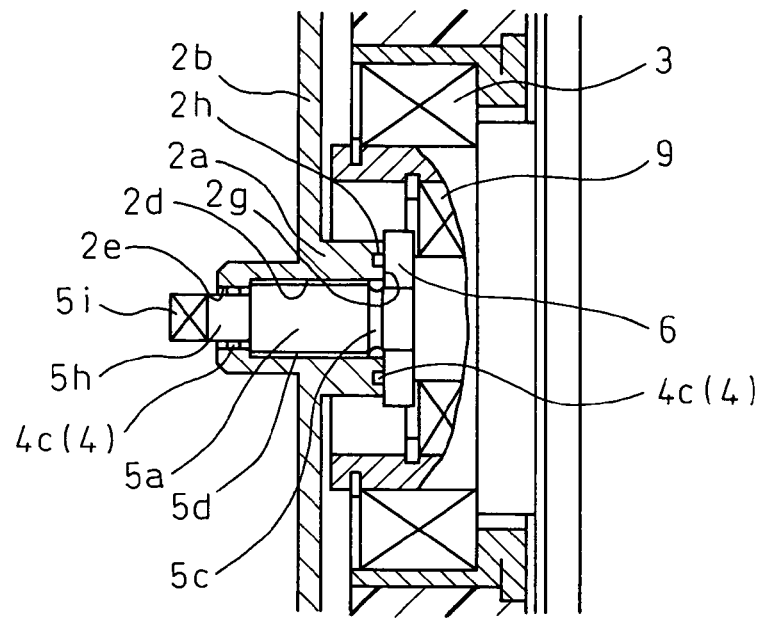
FIG. 4 is a sectional view showing a primary portion of the power transmission device of a third embodiment of the present invention.

FIG. 4 is a sectional view showing a primary portion of the power transmission device of the third embodiment of the present invention. In this third embodiment, the annular groove 2h is formed on the seating face 2g of the boss portion 2a of the hub 2. When the packing member 4c, which is the seal means 4, is attached in this groove 2h, sealing is conducted between the seating face 2g and the washer 6. In this way, in the third embodiment, in addition to the seal means 4 provided on the front face of the screw engaging portions 2d, 5d of the hub 2 and the rotary shaft 5 of the second embodiment, the seal means 4 is also provided on the rear face of the screw engaging portion. Other points of the structure are the same as those of the second embodiment. Therefore, the explanations are omitted here.

Figure 5:
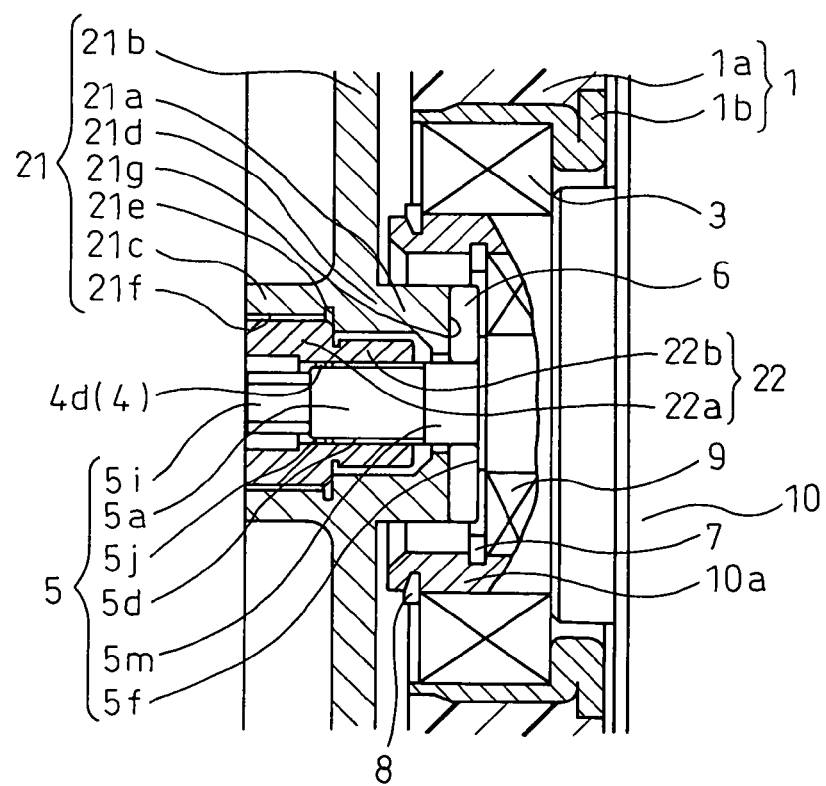
FIG. 5 is a sectional view showing a primary portion of the power transmission device of a fourth embodiment of the present invention.
Figure 6:
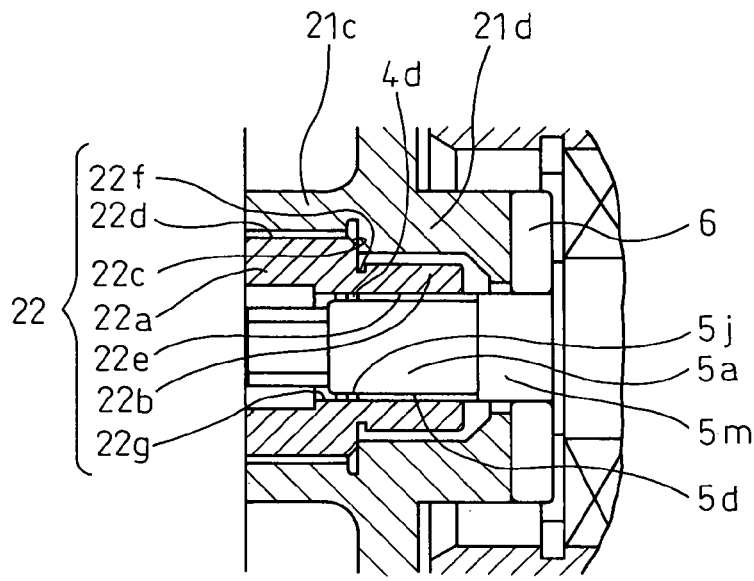
FIG. 6 is a partially enlarged sectional view of FIG. 5.

FIG. 5 is a sectional view showing a primary portion of the power transmission device of the fourth embodiment of the present invention, and FIG. 6 is a partially enlarged sectional view of FIG. 5. In the first to the third embodiments described above, the torque limiter portion is arranged on the rotary shaft 5 side. However, in this fourth embodiment, the torque limiter portion is arranged on the hub 2 side. The hub 2 is composed of a hub portion 21 and a limiter portion 22. The shape of the hub portion 21 is substantially the same as that of the hub 2 of the first to the third embodiments. However, as it is necessary to provide the limiter portion 22 between the hub portion 21 and the rotary shaft 5, only the shape of the boss portion 21a is different. The hub portion 21 includes: a cylindrical boss portion 21a; a plate portion 21b protruding from the outer circumferential face of the boss portion 21a in the radial direction; and a cylindrical outer ring portion (not shown) connected to the forward end of the plate portion 21b. This boss portion 21a includes a large inner diameter portion 21c and a small inner diameter portion 21d. On the inner circumferential face of the boss portion 21a, the step-shaped step face 21e is formed. On the inner circumferential face of the large inner diameter portion 21c of the boss portion 21a, the female screw portion 21f is formed, and the rear end face of the boss portion 21a is formed into a seating face 21g.

On the other hand, the limiter portion 22 is formed into a cylindrical shape including a large outer diameter portion 22a and a small outer diameter portion 22b corresponding to the boss portion 21a of the hub portion 21. On the outer circumferential face of the limiter portion 22, the seating face 22c, which is a step-shaped step, is formed. Further, on the outer circumferential face of the large outer diameter portion 22a, the male screw portion 22d is formed, and on the inner circumferential face of the small outer diameter portion 22b, the female screw portion 22e is formed while leaving a portion 22g. In the root portion of the seating face 22c of the limiter portion 22, the annular cutout portion 22f is formed. Therefore, when an excessively high axial force is given, this annular cutout portion 22f can be easily broken.

Concerning the rotary shaft 5 of the compressor, in the forward end portion 5a in which the male screw portion 5d is formed, the plane portion 5i, used for assembling, is provided. A portion of the outer circumferential face on the front side of the forward end portion 5a is a seal portion 5j in which the male screw portion 5d is not formed. In the fourth embodiment, the torque limiter portion 5b on the rotary shaft 5 side is abolished. This portion becomes the shaft portion 5m, the outer diameter of which is the same as that of the forward end portion 5a.

The hub portion 21, the limiter portion 22 and the rotary shaft 5, which are composed as described above, are combined with each other as follows. The female screw portion 21f of the large inner diameter portion 21c and the male screw portion 22d of the large outer diameter portion 22a are screwed and engaged with each other. The limiter portion 22 is inserted into the hub portion 21 so that the seating face 22c of the limiter portion 22 can be contacted with the step face 21e of the hub portion 21. In this way, the limiter portion 22 is connected to the hub portion 21 by means of screwing. Next, when the female screw portion 22e of the small outer diameter portion 22b of the limiter portion 22 and the male screw portion 5d of the rotary shaft 5 are screwed and engaged with each other, the limiter portion 22 is connected to the rotary shaft 5. Further, O-ring 4d, which is the seal means 4, is provided between a portion on the inner circumferential face of the small outer diameter portion 22b of the limiter portion 22, in which the female screw portion 22e is not formed, and the seal portion 5j of the rotary shaft 5 in which the male screw portion 5d is not formed. In this way, the seal means 4 is provided on the front face of the screw engaging portion of the limiter portion 22 and the rotary shaft 5.

Figure 7:
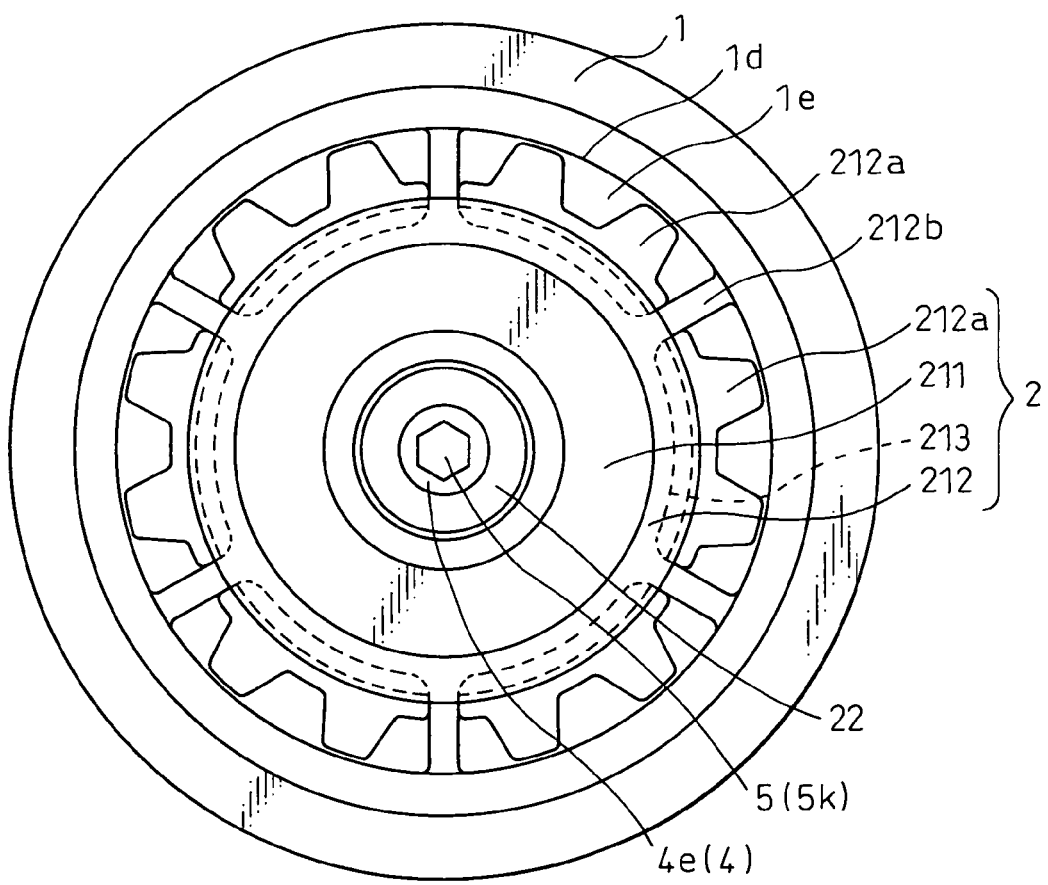
FIG. 7 is a front view showing a power transmission device of a fifth embodiment of the present invention.
Figure 8:
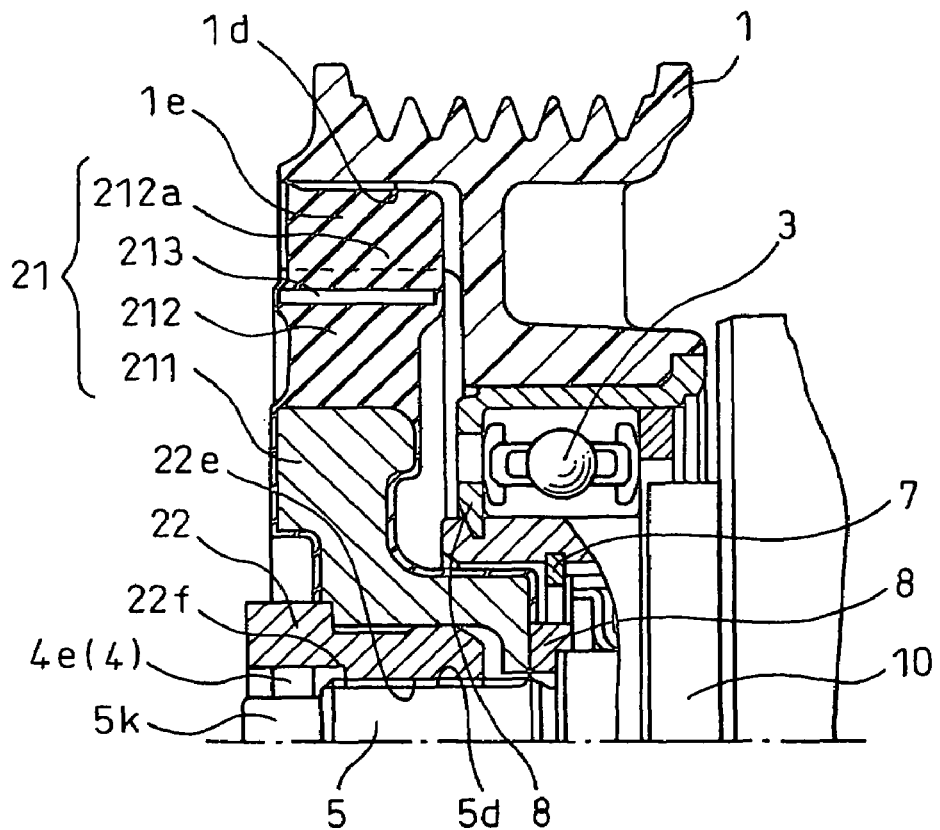
FIG. 8 is a sectional view showing an upper half of the power transmission device of the fifth embodiment of the present invention.

FIG. 7 is a front view showing a power transmission device of the fifth embodiment of the present invention, and FIG. 8 is a sectional view showing an upper half of the power transmission device of the fifth embodiment of the present invention. In the second embodiment shown in FIG. 3 and the fourth embodiment shown in FIGS. 5 and 6, O-rings 4b, 4d are used as the seal means 4 for sealing between the hub 2 (the limiter portion 22) and the rotary shaft 5. However, in the case of using an O-ring as described above, the following problems may be encountered. At the time of assembling, as the O-ring is pushed in while the outer and inner circumferences are being sealed, the O-ring is pushed in while the air inside the O-ring is being compressed. Therefore, even when the O-ring is inserted into a predetermined setting position, the O-ring is pushed back by the inner pressure and dislocated from the regular setting position. Further, the following problems may be also encountered. When the compressor is operated, the temperature of the rotary shaft is raised and the pressure of an oil, which is coated on the screw engaging portion between the hub (the limiter portion) and the rotary shaft, is increased and further the pressure of air enclosed inside the O-ring in the periphery of the screw engaging portion is increased. For the above reasons, the O-ring is pushed out from the regular setting position. Further, the plane portion Si used for assembling (the tool shape portion) is provided at the forward end portion of the rotary shaft. As shown in FIG. 6, other than the plane portion Si used for assembling, it is necessary to provide a seal portion 5h (a straight portion) in which the screw is not formed because of the necessity of sealing with the O-ring. Accordingly, the length of the rotary shaft is increased, which is disadvantageous from the viewpoint of the size of the device.

In order to solve the above problems, in the fifth embodiment, the seal means employs a packing member, and the seal structure between the packing member and the rotary shaft is improved. As the fifth embodiment is different from the first to the fourth embodiments in the structure of the hub 2, first of all, the structure of the hub 2 will be briefly explained below. In this connection, the seal structure of the fifth embodiment can be applied to any structure of the hub 2.

The hub 2 is composed of a hub portion 21 and a limiter portion 22. Further, this hub portion 21 includes: an inner hub 211, an elastic member 212 for torque transmission and an outer hub 213. The inner hub 211 is formed into a substantially cylindrical shape, and its inner circumferential face is formed into a shape substantially fitted to the outer circumferential face of the limiter portion 22, and the inner hub 211 and the limiter portion 22 are fixed to each other by means of engagement. The outer circumferential face of the inner hub 211 is connected to the elastic member 212 for torque transmission by means of adhesion and so on.

The outer hub 213 is formed into a cylindrical shape and is made of a metal such as iron in the same manner as that of the inner hub 211.

The elastic member 212 for torque transmission is made of elastic material such as rubber or resin and provided between the inner hub 211 and the outer hub 213 and around the outer hub 213. The outer circumferential face of the elastic member 212 for torque transmission, which is located at a position above the outer hub 213, is formed in such a manner that a protruding portion and a recess portion are alternately formed on the face. Therefore, the outer circumferential face of the elastic member 212 for torque transmission is the engaging portion 212a on the hub side. In engaging portion 212a on the hub side, as shown in FIG. 7, the slits 212b are provided in the circumferential direction at regular intervals.

Three members of the inner hub 211, the elastic member 212 for torque transmission and the outer hub 213 are connected to each other by means of adhesion and so forth. Alternatively, three members of the inner hub 211, the elastic member 212 for torque transmission and the outer hub 213 are integrally formed into the hub portion 21 by means of insert molding.

On the front side of the pulley 1, the recess portion 1d for accommodating the hub portion 21 is formed. When the circumferential wall face of this recess portion 1d is formed into a surface on which a protruding portion and a recess portion are alternately formed, the engaging portion 1e on the pulley side is formed. When the protruding portions and the recess portions are engaged with each other, the hub portion 21 and the pulley 1 are connected to each other.

On the rotary shaft 5 of the compressor, the tool shape portion 5k to be engaged with the tool is provided at the forward end portion 5a in which the male screw portion 5d is formed. On the other hand, the limiter portion 22 is formed into a cylindrical shape having a large outer diameter portion 22a and a small large diameter portion 22b. On the outer circumferential face of the limiter portion 22, the seating face 22c, which is a step-shaped step, is formed. On the inner circumferential face of the small outer diameter portion 22b, the female screw portion 22e is formed and screwed to the male screw portion 5d of the rotary shaft 5. The truly circular inner circumferential face of the large outer diameter portion 22a is larger than the inner circumferential face of the small outer diameter portion 22a in diameter. In the transition portion between both inner circumferential faces, the cutout portion 22f is formed. When an excessively high axial force is given to the cutout portion 22f, it is easily broken.

Between the tool shape portion 5k of the rotary shaft 5 and the inner circumferential face of the large outer diameter portion 22a of the limiter portion 22, the packing member 4e, which is a characteristic seal means of the fifth embodiment, is provided.

Figure 9:
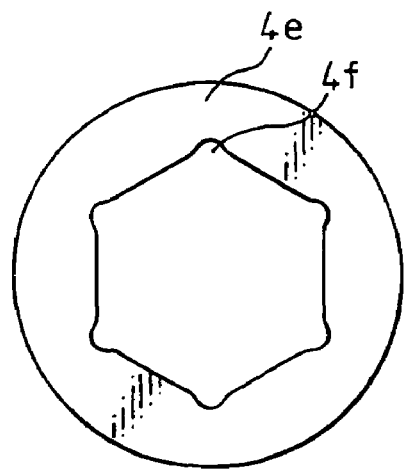
FIG. 9 is a plan view showing a packing member of Example 1 of the fifth embodiment of the present invention.

FIGS. 9 to 14D are views respectively showing a shape of the packing member 4e of each embodiment. FIG. 9 is a plan view of the packing member 4e of Example 1. In Example 1, the inner circumference of the packing member 4e is formed into a hexagon, and the cutout 4f is provided in each corner portion of this hexagon. The cutout portion 4f functions as a hole from which the inner pressure is released. In this case, the outer circumference of the square shape portion 5k of the rotary shaft 5 is formed into a hexagonal shape according to the shape of the inner circumference of the packing member 4e.

FIG. 10A is a plan view and a sectional view of the packing member 4e of Example 2. In Example 2, the inner circumference of the packing member 4e is formed into a circular shape, that is, the packing member 4e is an annular packing member. In the packing member 4e, four through-holes 4g are formed in the circumferential direction at the regular interval of 90°. These through-holes 4g are holes from which the inner pressure is released. In this connection, the number of the through-holes 4g is not limited to the above specific embodiment but it is possible to appropriately select the number of the through-holes 4g. In this case, the outer circumference of the tool shape portion 5k of the rotary shaft 5 is formed into a circular shape according to the shape of the inner circumference of the packing member 4e.

Figures 1, 2, 10B:
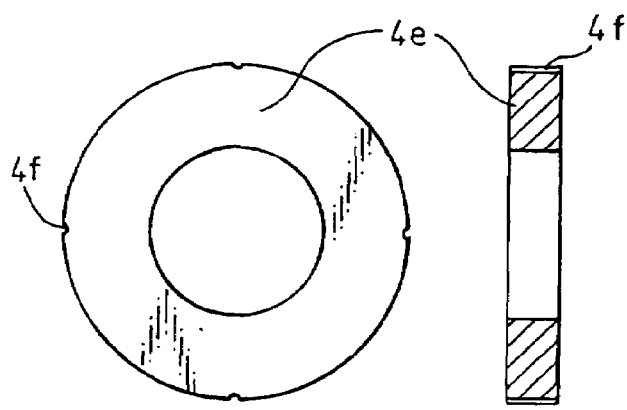

FIG. 10B is a plan view and a sectional view of the packing member 4e of Example 3. In Example 3, the inner circumference of the packing member 4e is formed into a circular shape. Instead of the through-holes 4g, four cutout portions 4f are provided on the outer circumference of the packing member 4e in the circumferential direction at the regular interval of 90°. These cutout portions 4f are holes from which the inner pressure is released. In this connection, the number of the cutout portions 4f is not limited to the above specific embodiment. In this case, the outer circumference of the tool shape portion 5k is circular.

Figures 1, 2, 10C:
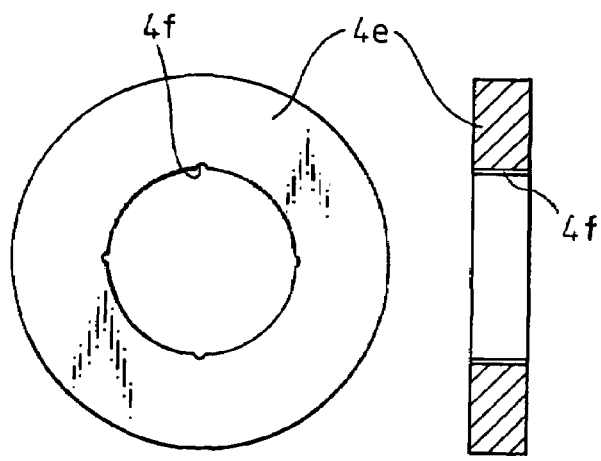

FIG. 10c is a plan view and a sectional view of the packing member 4e of Example 4. In Example 4, the inner circumference of the packing member 4e is formed into a circular shape. Instead of the through-holes 4g, four cutout portions 4f are provided on the inner circumference of the packing member 4e in the circumferential direction at the regular interval of 90°. These cutout portions 4f are holes from which the inner pressure is released. In this connection, the number of the cutout portions 4f is not limited to the above specific embodiment. In this case, the outer circumference of the tool shape portion 5k is circular.

Figures 1, 2, 11A:
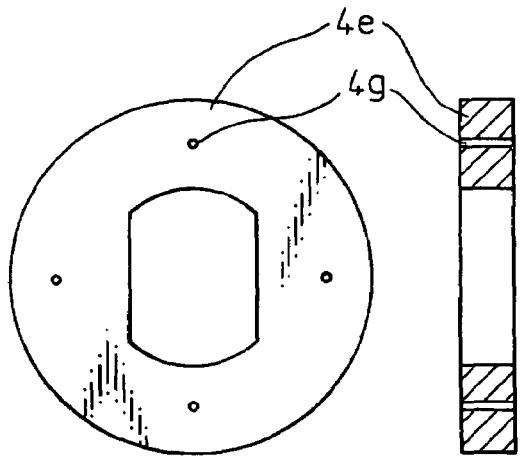

FIG. 11A is a plan view and a sectional view of the packing member 4e of Example 5. In Example 5, the inner circumference of the packing member 4e is formed into a width across flat shape. Accordingly, the outer circumference of the tool shape portion 5k of the rotary shaft 5 is formed into a width across flat shape in the same manner. In the packing 4e, four through-holes 4g are provided in the circumferential direction at the regular interval of 90°. These through-holes 4g are holes from which the inner pressure is released. The number of the through-holes 4g is not limited to the above specific embodiment.

Figures 1, 2, 11B:
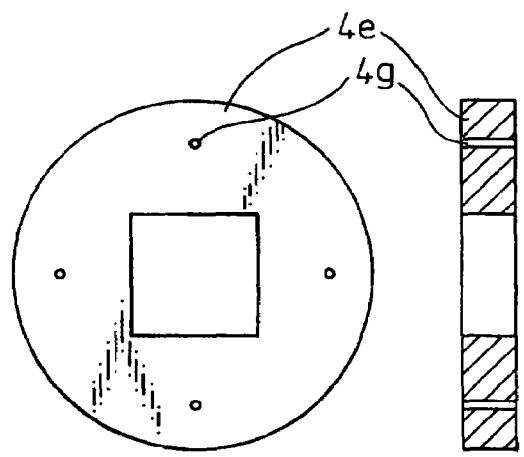

FIG. 11B is a plan view and a sectional view of the packing member 4e of Example 6. In Example 6, the inner circumference of the packing member 4e is formed into a square shape. Accordingly, the outer circumference of the tool shape portion 5k is formed into a square shape in the same manner. In the packing 4e, four through-holes 4g are provided in the circumferential direction at the regular interval of 90°. These through-holes 4g are holes from which the inner pressure is released. The number of the through-holes 4g is not limited to the above specific embodiment.

Figures 1, 2, 11C:
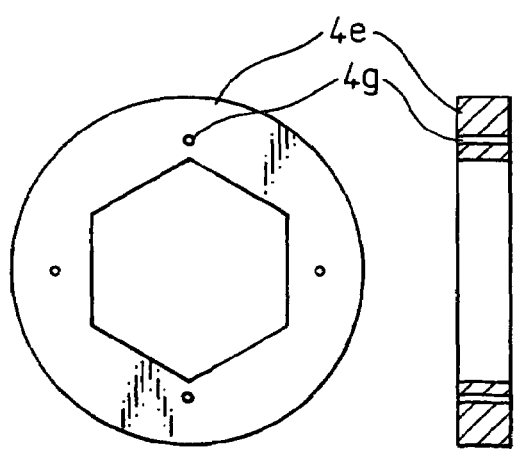

FIG. 11C is a plan view and a sectional view of the packing member 4e of Example 7. In Example 7, the inner circumference of the packing member 4e is formed into an equilateral hexagon in the same manner as that of Example 1. Accordingly, the outer circumference of the tool shape portion 5k is formed into an equilateral hexagon in the same manner. In Example 7, instead of the cutout portions 4f of Example 1, four through-holes 4g are provided in the circumferential direction at the regular interval of 90°. These four through-holes 4g are holes from which the inner pressure is released. The number of the through-holes 4g is not limited to the above specific embodiment.

Figures 1, 2, 12A:
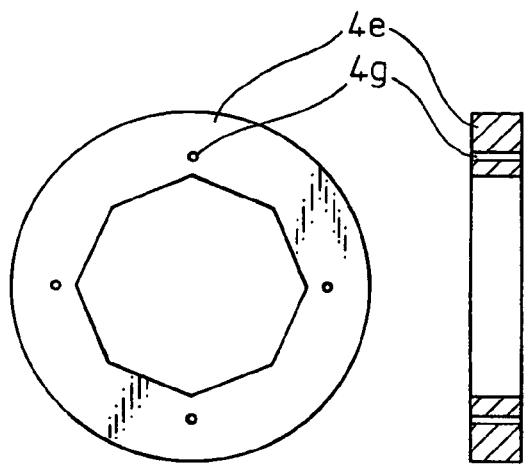

FIG. 12A is a plan view and a sectional view of the packing member 4e of Example 8. In Example 8, the inner circumference of the packing member 4e is formed into an equilateral octagon. Accordingly, the outer circumference of the tool shape portion 5k is formed into an equilateral octagon in the same manner. In the packing member 4e, four through-holes 4g are provided in the circumferential direction at the regular interval of 90°. These four through-holes 4g are holes from which the inner pressure is released. The number of the through-holes 4g is not limited to the above specific embodiment.

Figures 1, 2, 12B:
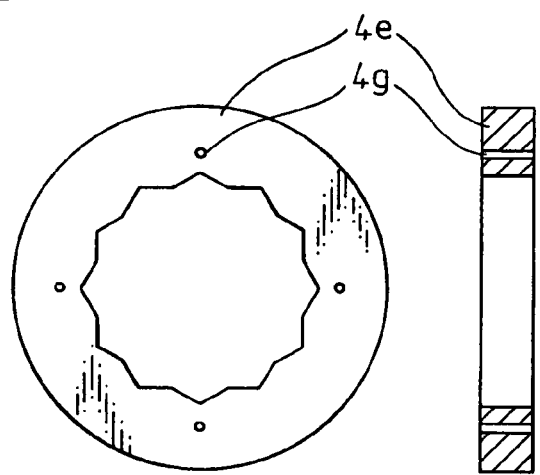

FIG. 12B is a plan view and a sectional view of the packing member 4e of Example 9. In Example 9, the inner circumference of the packing member 4e is formed into an equilateral dodecagon. Accordingly, the outer circumference of the tool shape portion 5k is formed into an equilateral dodecagon in the same manner. In the packing member 4e, four through-holes 4g are provided in the circumferential direction at the regular interval of 90°. These four through-holes 4g are holes from which the inner pressure is released. The number of the through-holes 4g is not limited to the above specific embodiment.

Figures 1, 2, 12C:
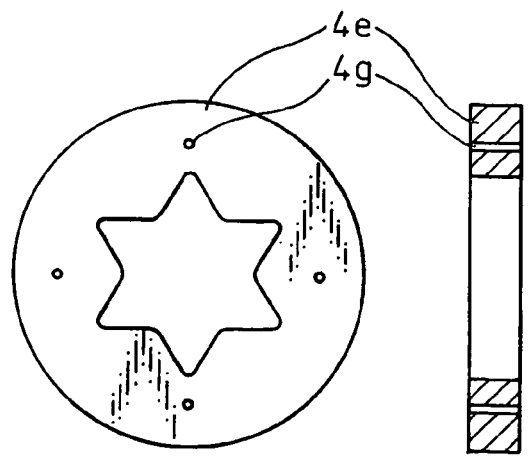

FIG. 12C is a plan view and a sectional view of the packing member 4e of Example 10. In Example 10, the inner circumference of the packing member 4e is formed into a star shape. Accordingly, the outer circumference of the tool shape portion 3k is formed into a star shape in the same manner. In the packing member 4e, four through-holes 4g are provided in the circumferential direction at the regular interval of 90°. These four through-holes 4g are holes from which the inner pressure is released. The number of the through-holes 4g is not limited to the above specific embodiment.

Figures 1, 2, 13A:
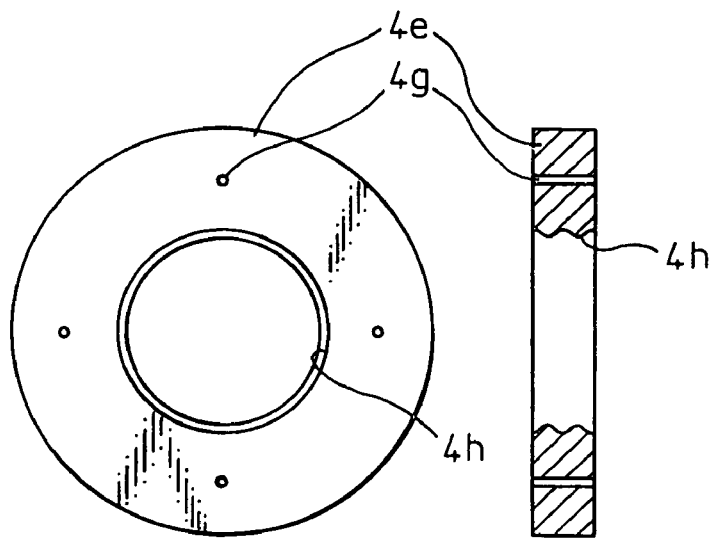

FIG. 13A is a plan view and a sectional view of the packing member 4e of Example 11. In Example 11, the inner circumference of the packing member 4e is formed into a circular shape, and the labyrinth 4h is formed on the inner circumferential face. As shown in FIG. 13A, the cross section of the labyrinth 4h has two top portions. Accordingly, the outer circumference of the tool shape portion 5k is circular. In the packing member 4e, four through-holes 4g are provided in the circumferential direction at the regular interval of 90°. These four through-holes 4g are holes from which the inner pressure is released. The number of the through-holes 4g is not limited to the above specific embodiment.

Figures 1, 2, 13B:
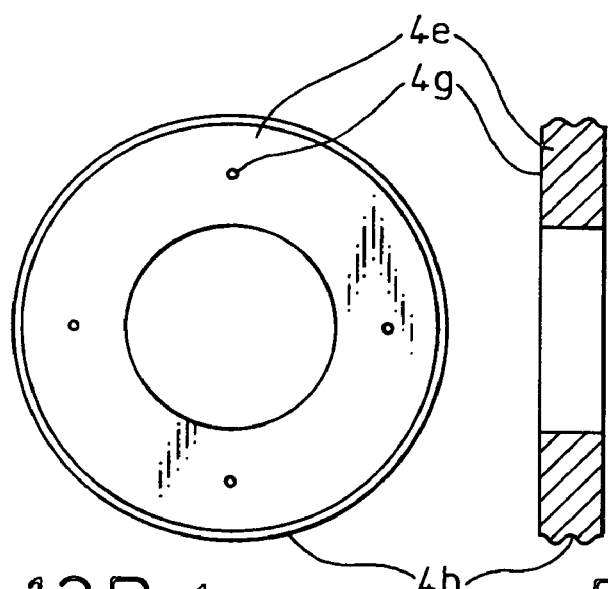

FIG. 13B is a plan view and a sectional view of the packing member 4e of Example 12. In Example 11, the labyrinth 4h is provided on the inner circumferential face of the packing member 4e. However, in Example 12, the labyrinth 4h is provided on the outer circumferential face of the packing member 4e. Other points of the structure are essentially the same as those of Example 11.

Figure 14A:
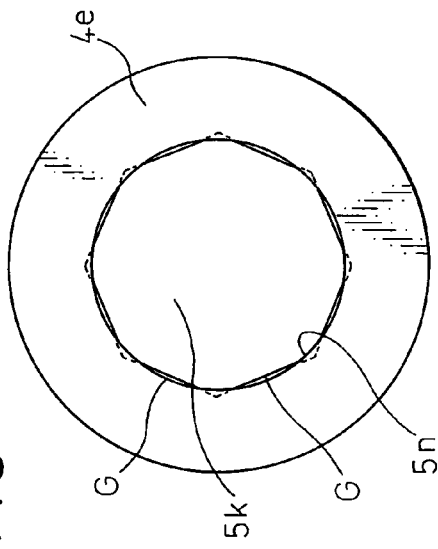
FIG. 14A is a view showing a relation between the packing member and the tool shape portion of Example 13 of the fifth embodiment.

FIG. 14A is a view showing a relation between the packing member 4e of Example 13 and the tool shape portion 5k. In Example 13, the outer circumference of the tool shape portion 5k of the rotary shaft 5 is formed into a square, and the four corners of the square are chamfered and formed into round portions 5n. On the other hand, the inner circumference of the packing member 4e is formed into a circle. Accordingly, when the packing member 4e is assembled into the tool shape portion 5k so that round portions 5n can be contacted with the inner circumference of the packing member 4e, minute gaps G are formed between the outer circumference of the tool shape portion 5k and the inner circumference of the packing member 4e. These minute gaps G are holes from which the inner pressure is released. Therefore, it is unnecessary to provide the cutout portions 4f and the through-holes 4g.

Figure 14C:
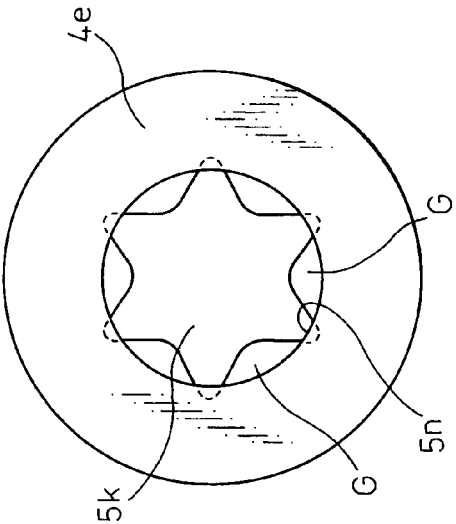
FIG. 14C is a view showing a relation between the packing member and the tool shape portion of Example 15 of the fifth embodiment.
Figure 14B:
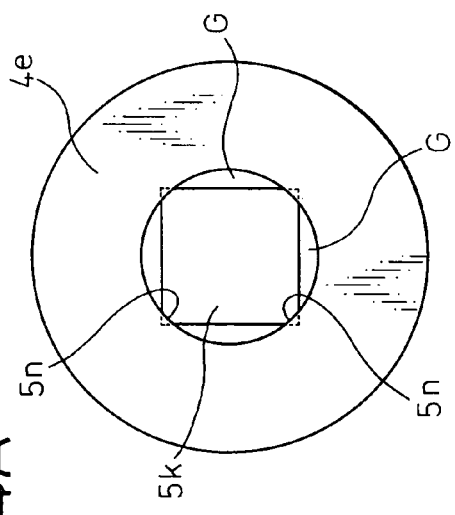
FIG. 14B is a view showing a relation between the packing member and the tool shape portion of Example 14 of the fifth embodiment.

FIG. 14B is a view showing a relation between the packing member 4e of Example 14 and the tool shape portion 5k. In Example 14, the outer circumference of the tool shape portion 5k of the rotary shaft 5 is formed into an equilateral hexagon, and the six corners of the hexagon are chamfered and formed into round portions 5n. Other points of the structure are the same as those of Example 13. Minute gaps G are formed between the outer circumference of the tool shape portion 5k and the inner circumference of the packing member 4e. These minute gaps G are holes from which the inner pressure is released.

FIG. 14C is a view showing a relation between the packing member 4e of Example 15 and the tool shape portion 5k.

In Example 15, the outer circumference of the tool shape portion 5k of the rotary shaft 5 is formed into an equilateral octagon, and the eight corners of the octagon are chamfered and formed into round portions 5n. Other point of the structure are the same as those of Examples 13 and 14. Minute gaps G are formed between the outer circumference of the tool shape portion 5k and the inner circumference of the packing member 4e. These minute gaps G are holes from which the inner pressure is released.

Figure 14D:
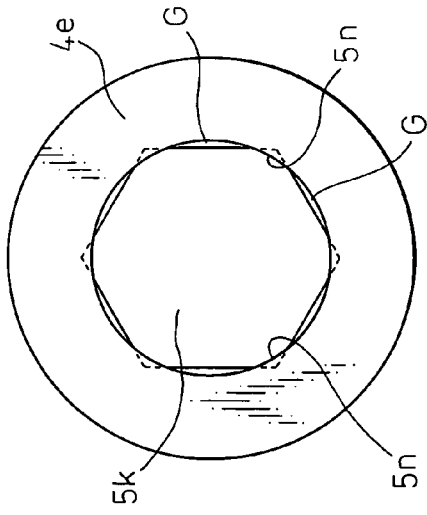
FIG. 14D is a view showing a relation between the packing member and the tool shape portion of Example 16 of the fifth embodiment.

FIG. 14D is a view showing a relation between the packing member 4e of Example 16 and the tool shape portion 5k. In Example 16, the outer circumference of the tool shape portion 5k of the rotary shaft 5 is formed into a star shape, and the six corners of the star shape are chamfered and formed into round portions 5n. Other point of the structure are the same as those of Examples 13 to 15. Minute gaps G are formed between the outer circumference of the tool shape portion 5k and the inner circumference of the packing member 4e. These minute gaps G are holes from which the inner pressure is released.

In each of Examples 13 to 16 shown in FIGS. 14A to 14D, the inner circumference of the packing member 4e is circular, and the outer circumference of the tool shape portion 5k is formed into a polygon or a star shape, and when the corner portions are chamfered and round portions 5n are formed, minute gaps G are formed between the outer circumference of the tool shape portion 5k and the inner circumference of the packing member 4e. However, in Examples 17 to 20 shown in FIGS. 15A to 15D, the inner circumference of the packing member 4e is formed into the same polygonal shape or the star shape as that of the outer circumference of the tool shape portion 5k, and the corner portions are chamfered and round portions 5n are formed. In this way, minute gaps G are formed between the inner circumference of the packing member 4e and the outer circumference of the tool shape portion 5k.

Figure 15A:
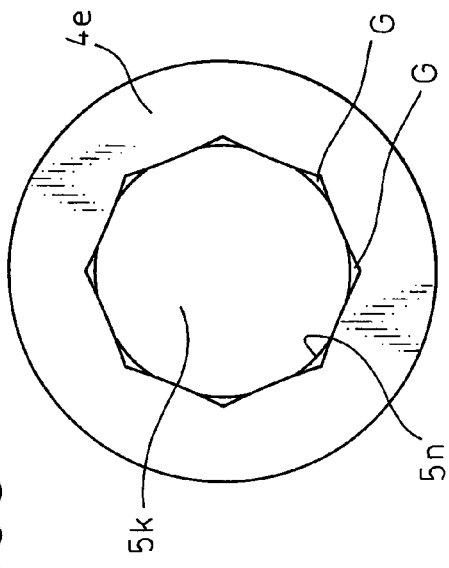
FIG. 15A is a view showing a relation between the packing member and the tool shape portion of Example 17 of the fifth embodiment.

In Example 17 shown in FIG. 15A, the outer circumference of the tool shape portion 5k is formed into a square, and the inner circumference of the packing member 4e is also formed into the same square. The corner portions of the tool shape portion 5k are chamfered and round portions 5n are formed. In the corner portions, four minute gaps G are formed between the outer circumference of the tool shape portion 5k and the inner circumference of the packing 4e. These four minute gaps G are holes from which the inner pressure is released.

Figure 15B:
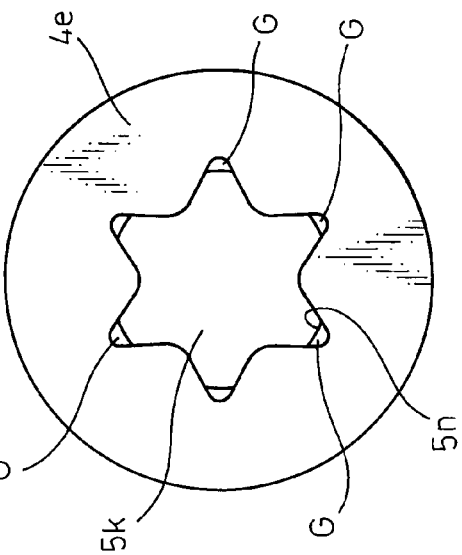
FIG. 15B is a view showing a relation between the packing member and the tool shape portion of Example 18 of the fifth embodiment.

In Example 18 shown in FIG. 15B, the outer circumferential shape of the tool shape portion 5k is formed into an equilateral hexagon, and the inner circumferential shape of the packing member 4e is also formed into an equilateral hexagon, and the corner portions of the tool shape portion 5k are chamfered and round portions 5n are formed. Accordingly, in the corner portions, six minute gaps G are formed between them. These minute gaps G are holes from which the inner pressure is released.

Figure 15C:
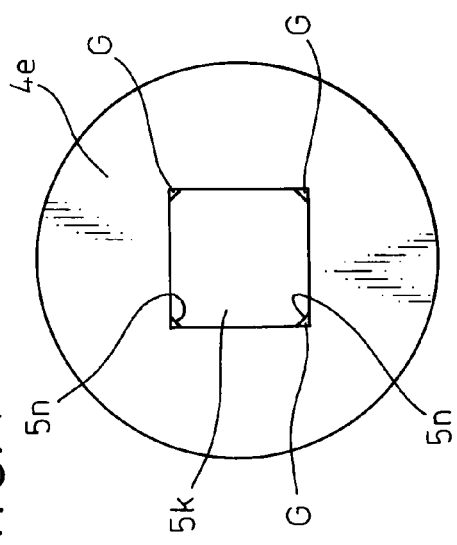
FIG. 15C is a view showing a relation between the packing member and the tool shape portion of Example 19 of the fifth embodiment.

In Example 19 shown in FIG. 15C, the outer circumferential shape of the tool shape portion 5k and the inner circumferential shape of the packing member 4e are respectively formed into an equilateral octagon, and R portions 5n are formed in the corner portions of the tool shape portion 5k. Accordingly, in the corner portions, eight minute gaps G are formed between them in the same manner. These minute gaps G are holes from which the inner pressure is released.

Figure 15D:
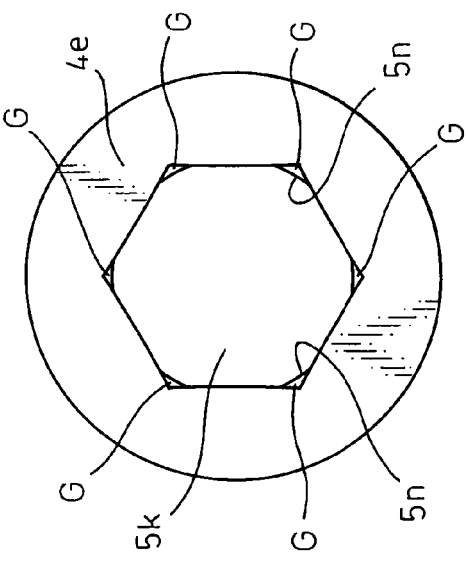
FIG. 15D is a view showing a relation between the packing member and the tool shape portion of Example 20 of the fifth embodiment.

In Example 20 shown in FIG. 15D, the outer circumference of the tool shape portion 5k is formed into a star shape, and the inner circumference of the packing member 4e is also formed into the same star shape. Six inner corner portions of the tool shape portion 5k are circularly cut into round portions 5n. Accordingly, six minute gaps G are formed between the outer circumference of the tool shape portion 5k and the inner circumference of the packing member 4e. These minute gaps G are holes from which the inner pressure is released.

Concerning the material of the packing members 4e of Examples 1 to 20 of the fifth embodiment, it is preferable to use elastic material having a sealing function such as silicon rubber, acrylic rubber or fluorine rubber. It is preferable that the diameter of the through-hole 4g of the packing member 4e is not less than φ0.1 mm. Further, it is preferable that the area of each cutout portion 4f or each gap G is not less than 0.02 mm$^2$. It is preferable that the thickness of the packing member 4e is not less than 4% with respect to the outer diameter of the packing member 4e.

Figure 16:
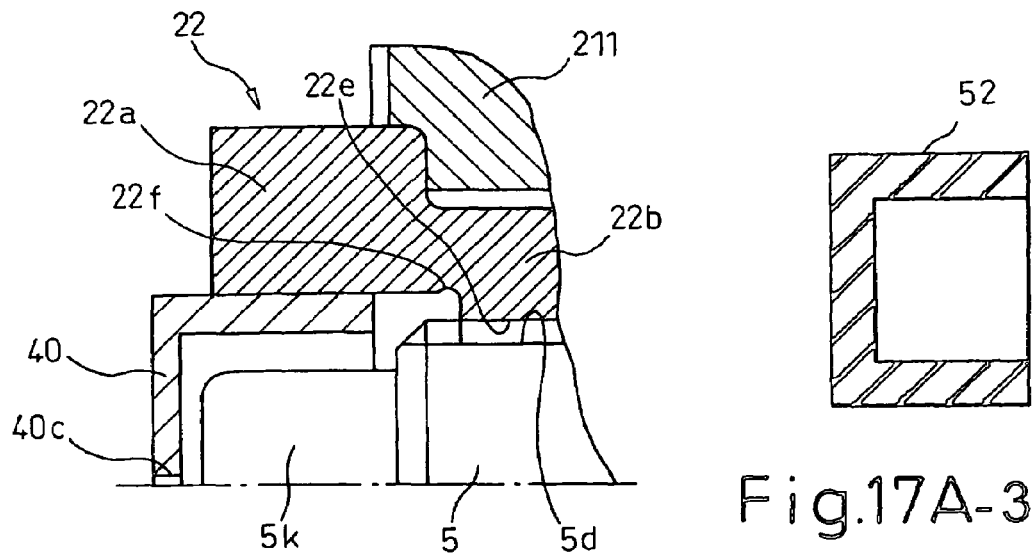
FIG. 16 is a sectional view showing a primary portion of the power transmission device of a sixth embodiment of the present invention.

FIG. 16 is a sectional view showing a primary portion of the power transmission device of the sixth embodiment of the present invention. In each of the second and the fourth embodiments described before, the O-ring 4b, 4d, which is the sealing means 4, is arranged in the front of the screw engaging portion of the hub 2 and the rotary shaft 5. However, in the case of the O-ring, although the O-ring is effective for preventing the corrosion of the screw engaging portion, no effect can be provided to prevent the corrosion at the forward end portion of the rotary shaft 5 of the compressor. Therefore, when the forward end portion of the rotary shaft 5 of the compressor is corroded, the appearance of the device is spoilt. With respect to the corrosion caused at the forward end portion of the rotary shaft, in the first embodiment described before, the flat packing member 4a made of silicon rubber is arranged as a cap so that the flat packing member 4a can be used as the sealing means 4. This structure is effective for the prevention of the corrosion caused at the forward end portion of the rotary shaft, however, this structure is not so effective for the prevention of the corrosion caused at the screw engaging portion. Further, in this first embodiment, it is necessary to provide a portion for attaching the flat packing member 4a on the hub 2 side. Therefore, the axial length is extended.

In the sixth embodiment, in order to solve the above problems, the cap 40 is used as the sealing means 4. In the sixth embodiment, the rotary shaft 5, the hub 2 and the pulley 1 are essentially composed in the same manner as those of the fifth embodiment. That is, on the rotary shaft 5, the tool shape portion 5k is provided at the forward end portion 5a in which the male screw portion 5d is formed. On the other hand, the limiter portion 22, which is engaged and connected to the inner hub 211, is formed into a cylindrical shape having the large outer diameter portion 22a and the small outer diameter portion 22b, and the female screw portion 22e is formed on the inner circumferential face of the small outer diameter portion 22b. This female screw portion 22e is screwed to the male screw portion 5d of the rotary shaft 5. The circular inner circumferential face of the large outer diameter portion 22a is a little larger than the inner circumferential face of the small outer diameter portion 22b in diameter. The cutout portion 22f is formed in the transition portion between both the inner circumferential faces. This cutout portion 22f is easily broken when an excessively high axial force is given to the torque limiter portion 22 by the seizure of the compressor.

In order to stabilize the coefficient of friction, the screw engaging portion formed between the rotary shaft 5 and the torque limiter portion 22 is subjected to a surface treatment or is coated with oil. Further, in order to prevent the invasion of water and dust from the outside, the cap 40, which is the seal means 4, is attached onto the inner circumferential face of the large outer diameter portion 22a of the limiter portion 22 so that the cap 40 can cover the tool shape portion 5k at the forward end portion of the rotary shaft 5. The cap 40 is formed into a cylindrical shape having a bottom portion, one side of which is open. A sealing structure is composed of the outer circumferential portion 40a of the cap 40 and the inner circumferential face of the large outer diameter portion 22a. In this case, the material of the torque limiter portion 22 can be any of metallic material, resin material or ceramic. In the case where a single material is used for the material of the cap 40, it is preferable to use a rubber material or a resin material such as silicon rubber, acrylic rubber, fluorine rubber or NBR.

FIGS. 17A-1 to 21-2 show various different examples of the cap, or the sealing means 4, of the sixth embodiment.

Figures 1, 2, 3, 17A:
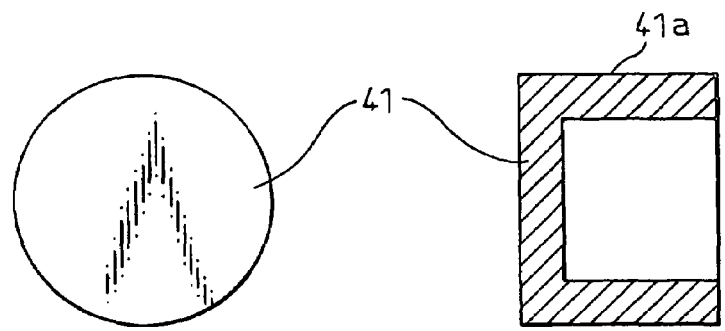

FIGS. 17A-1 and 17A-2 show a cap 41 of Example A. One end of the cap 41 of Example A is open and the other end is closed, that is, the cap 41 of Example A is formed into a cylindrical shape having a bottom portion. The cap 41 has a circumferential portion 41a.

FIGS. 17A-3 shows a cap like that of FIGS. 17A-2 that is made of elastic material.

Figures 1, 2, 17B:
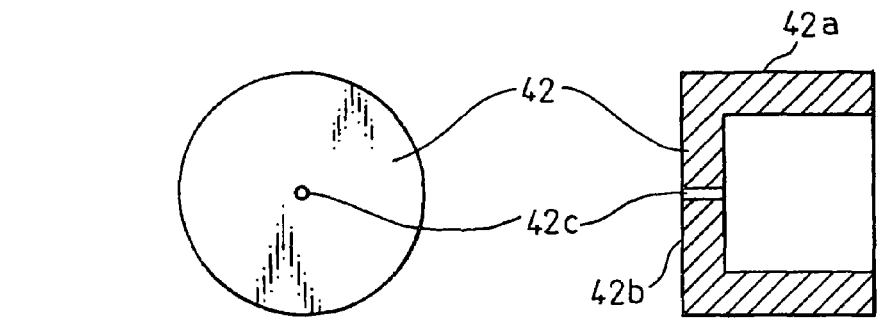

FIGS. 17B-1 and 17B-2 show a cap 42 of Example B. In the cap 42 of Example B, one hole 42c, from which the inner pressure is released, is formed at the substantial center of the lid portion 42b of the cylindrical cap 42 having a bottom portion. A plurality of holes 42c, from which the inner pressure is released, may be formed. It is preferable that the area of one pressure releasing hole 42c is not less than 0.02 mm². Accordingly, even when the temperature of the rotary shaft 5 is raised at the time of operating the compressor and when the oil coated on the screw engaging portion and the air in the periphery of the screw engaging portion are expanded by the rise of the temperature, the inner pressure can be released from this hole 42c. The cap 42 has a circumferential portion 42a.

Figures 1, 2, 18A:
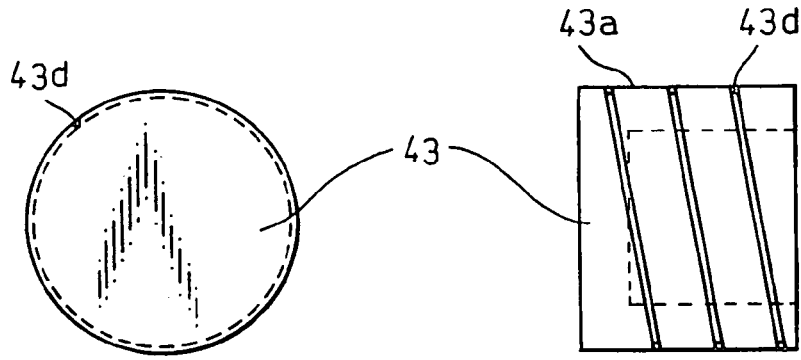

FIGS. 18A-1 and 18A-2 show a cap 43 of Example C. In the cap 43 of Example C, the spiral groove 43d is formed in the outer most circumferential portion 43a of the cylindrical cap 43 having a bottom portion. It is preferable that the sectional area of this groove 43d is not less than 0.02 mm². The function of this groove 43d is the same as that of the pressure releasing hole 42c.

Figures 1, 2, 18B:
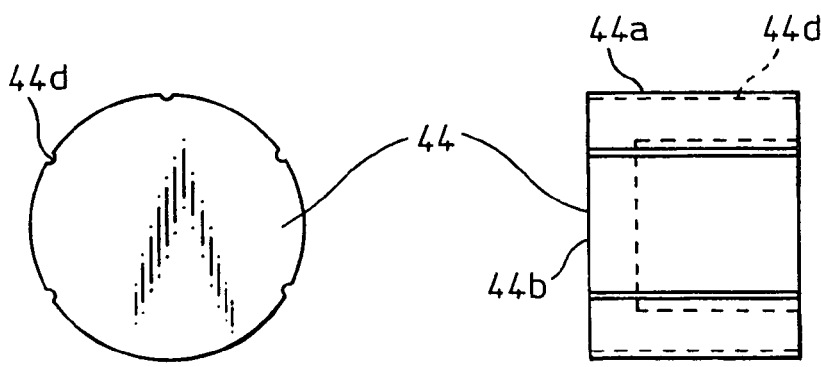

FIGS. 18B-1 and 18B-2 show a cap 44 of Example D. The cap 44 has a lid portion 44b and a circumferential portion 44a. In the cap 44 of Example D, instead of the spiral groove 43d, a plurality of linear grooves 44d are formed and arranged in the circumferential direction at regular intervals and extended in the axial direction. The sectional area of one groove 44d is preferably not less than 0.02 mm².

Figures 1, 2, 18C:
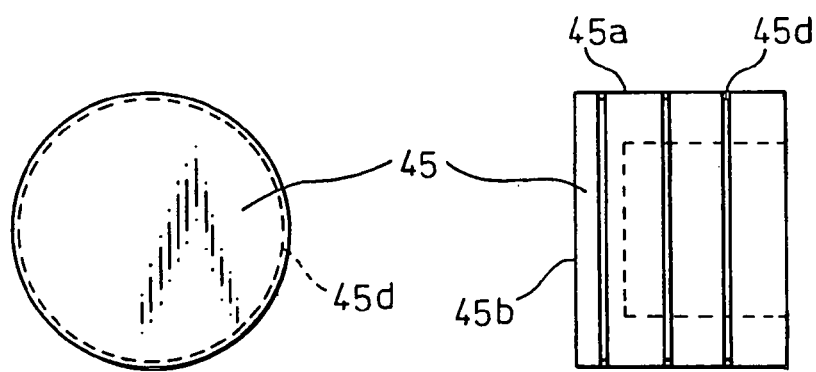

FIGS. 18C-1 and 18C-2 show a cap 45 of Example E. The cap 45 has a lid portion 45b as shown. In the cap 45 of Example E, instead of the spiral and linear grooves 44d, a plurality of ring-shaped grooves 45d are formed and are provided on the outer circumferential portion 45a of the cylindrical cap 45 having a bottom portion. The grooves 45d are arranged in the axial direction at regular intervals.

Figures 1, 2, 19A:
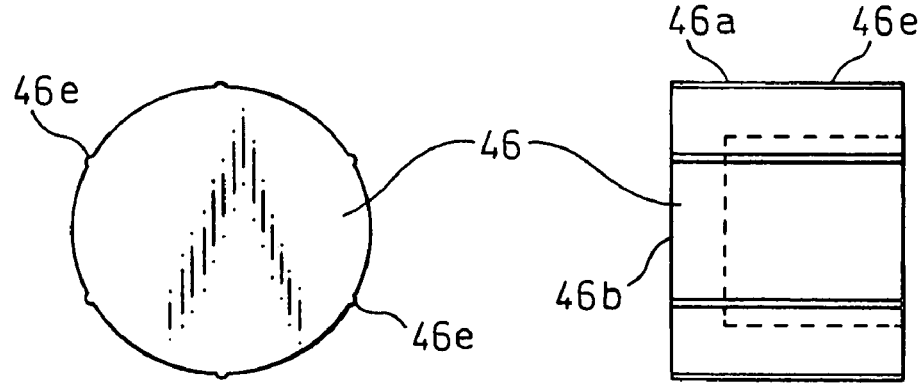

In FIGS. 19A-1, 19A-2, 19B-1 and 19B-2, instead of the grooves 44d, protrusions 46e and 47e are formed in the outer circumferential portions 46a and 47a, respectively, of caps 46 and 47. FIGS. 19A-1 and 19A-2 show the cap 46 of Example F. In the cap 46 of Example F, a plurality of protrusions 46e, which extend in the axial direction, are formed in the outer circumferential portion 46a of the cylindrical cap 46 having a bottom portion at regular intervals in the circumferential direction. In this embodiment, the number of the protrusions 46e is six, however, the present invention is not limited to the above specific number of protrusions 46e. The protrusions 46e can provide the same effects of releasing the inner pressure as the pressure releasing hole 42c and the grooves 43d, 44d, 45d.

Figures 1, 2, 19B:
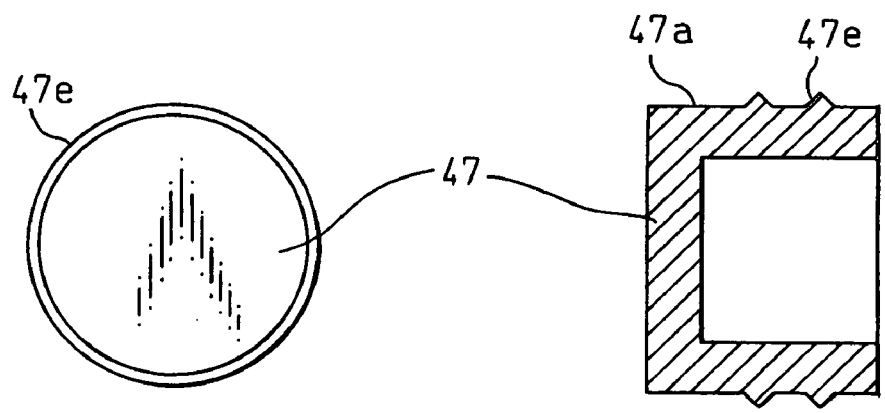

FIGS. 19B-1 and 19B-2 show a cap 47 of Example G. In the cap 47 of Example G, a plurality of ring-shaped protrusions 47e are formed in the outer circumferential portion 47a of the cap 47 at regular intervals in the axial direction.

Figures 1, 2, 20A:
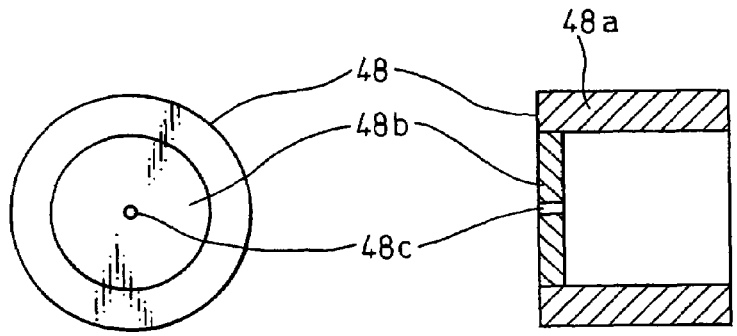

FIGS. 20A-1, 20A-2, 20B-1, 20B-2, 20C-1, and 20C-2 show examples in which caps 48, 49, 50 are composed of a plurality of materials (composite materials). FIGS. 20A-1 and 20A-2 show a cap 48 of Example H. The cap 48 of Example H is composed in such a manner that the outer circumferential portion 48a is made of metallic material such as iron or aluminum so that the cap 40 can be strongly engaged with the torque limiter side. The material of the lid portion 48b may be either a metallic material or an elastic material. At the substantial center of the lid portion 48b, an inner pressure releasing hole 48c is formed.

Figures 1, 2, 20B:
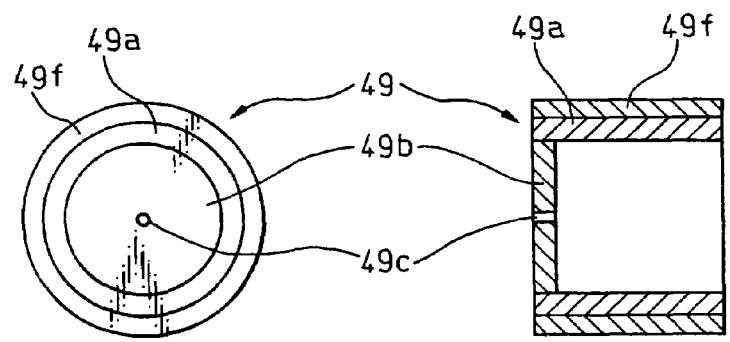

FIGS. 20B-1 ad 20B-2 show a cap 49 of Example I. The cap 49 of Example I is composed in such a manner that the outer circumferential portion 49a is made of a metallic material such as iron or aluminum, and a covering material layer 49f, made of elastic material, is provided so that the covering material layer 49f can cover the outer circumferential portion 49a. Due to the above structure, the cap 49 can be strongly engaged with the torque limiter side 22, and further the sealing property can be enhanced. At the substantial center of the lid portion 49b, an inner pressure releasing hole 49c is provided. The material of the lid portion 49b may be either a metallic material or an elastic material.

Figures 1, 2, 20C:
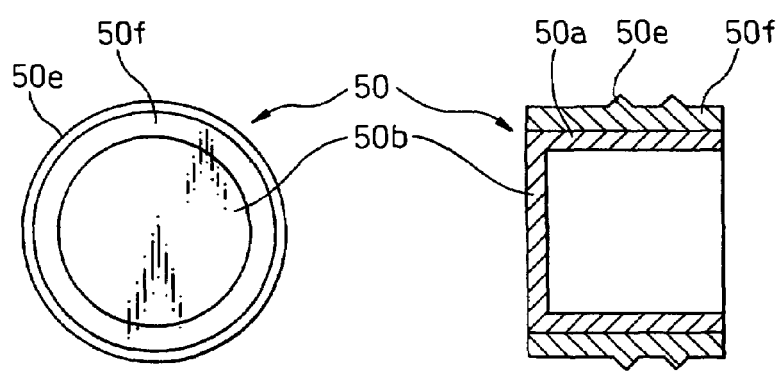

FIGS. 20C-1 and 20C-2 show a cap 50 of Example J. The cap 50 of Example J is composed in such a manner that the outer circumferential portion 50a and the lid portion 50b are integrally composed of a metallic member and formed into a cylindrical shape having a bottom portion. Further, the covering layer 50f made of elastic material is provided so that it can cover the outside of the outer circumferential portion 50a. On this covering layer 50f, a plurality of ring-shaped protrusions 50e are formed in the axial direction at regular intervals.

FIGS. 21-1 and 21-2 show a cap 51 of Example K. The cap 51 of Example K is composed as follows. In order to make an inner circumferential portion 51g of the cap 51 provide a sealing effect together with the outer circumferential portion 51a, the shape of the inner circumferential portion 51g of the cap 51 is formed into substantially the same shape as that of the forward end portion shape of the rotary shaft 5 of the compressor. That is, the inner circumferential portion 51g of the cap 51 is formed into the shape which is fitted to the tool shape portion 5k of the rotary shaft 5 and also fitted to a portion of the male screw portion 5*d*. At the substantial center of the lid portion 51*b* of the cap 51, an inner pressure releasing hole 51*c* is formed. The shape of the inner circumferential portion 51*g* of the cap 51 may be a circle, square, hexagon, octagon, decagon or dodecagon, that is, the shape of the inner circumferential portion 51*g* of the cap 51 may be an appropriate shape which agrees with the shape of the tool shape portion 5*k*.

As described above, in the sixth embodiment, when the cap 40 is employed as the sealing means, the rust prevention of the screw engaging portion and the rust prevention of the forward end of the rotary shaft can be accomplished without unnecessarily increasing the size of the compressor.

As explained above, according to the present invention, when the sealing means is provided on the front face or on the front and the rear face of the screw engaging portion of the hub and the rotary shaft, it is possible to prevent the invasion of water and foreign objects from the outside into the screw portion. Further, it is possible to prevent oil, which was coated on the screw portion at the initial stage, from leaking out. Therefore, it is possible to suppress a change in the coefficient of friction of the screw portion. Accordingly, it is possible to obtain a stable torque limiting characteristic.

The invention claimed is:

1. A power transmission device comprising:
   a pulley rotatably attached to a casing;
   a hub arranged at a forward end portion of a rotary shaft protruding outside from the casing, and rotated integrally with the rotary shaft, wherein the hub includes a torque limiter for shutting off an excessively high torque transmission between the pulley and the rotary shaft;
   an elastic member for torque transmission, interposed between the pulley and the hub, and held by both the pulley and the hub, wherein
   the hub and the rotary shaft are connected to each other by engagement of a female screw portion, which is formed on an inner circumferential face of the hub, with a male screw portion which is formed on an outer circumferential face of the forward end portion of the rotary shaft,
   the power transmission device further comprising a seal means for sealing a portion between the hub and the rotary shaft, the seal means being arranged in the front of the screw engaging portion or in the front and the rear of the screw engaging portion, wherein
   the seal means is a cap that closes an opening of a large outer diameter portion of the torque limiter;
   an outer circumferential face of the cap is a sealing face that seals an inner circumferential face of the large outer diameter portion of the torque limiter;
   the torque limiter portion and the rotary shaft are connected to each other by the engagement of the male and female screw portions; and
   when the torque limiter is loaded with an excessively high torque, the torque limiter is broken by an excessive axial force that is generated by the engagement of the screw portions.

2. A power transmission device according to claim 1, wherein one or a plurality of holes, from which the inner pressure is released, are provided in the cap.

3. A power transmission device according to claim 1, wherein ring-shaped grooves, spiral grooves or a plurality of linear grooves, which are arranged in the circumferential direction at regular intervals and are extended in the axial direction, are provided on an outer circumferential face of the cap.

4. A power transmission device according to claim 1, wherein ring-shaped protrusions are provided on an outer circumferential face of the cap or a plurality of linear protrusions are provided on the outer circumferential face of the cap and are extended in the axial direction, are provided at regular intervals in the circumferential direction.

5. A power transmission device according to claim 1, wherein the cap is made of an elastic material, a rubber, a resin, a metallic material, iron or aluminum, or a composite of an elastic material and a metallic material.

* * * * *

UNITED STATES PATENT AND TRADEMARK OFFICE
CERTIFICATE OF CORRECTION

PATENT NO. : 7,393,281 B2 Page 1 of 1
APPLICATION NO. : 11/251774
DATED : July 1, 2008
INVENTOR(S) : Michiyasu Nosaka et al.

It is certified that error appears in the above-identified patent and that said Letters Patent is hereby corrected as shown below:

Title page

Correct Item (73), as Assignee should read:

DENSO CORPORATION, Kariya-city (JP)

Signed and Sealed this

Thirty-first Day of August, 2010

David J. Kappos
*Director of the United States Patent and Trademark Office*